(12) United States Patent
Koike et al.

(10) Patent No.: US 7,998,892 B2
(45) Date of Patent: Aug. 16, 2011

(54) $TIO_2$-CONTAINING SILICA GLASS AND OPTICAL MEMBER FOR LITHOGRAPHY USING THE SAME

(75) Inventors: Akio Koike, Tokyo (JP); Yasutomi Iwahashi, Tokyo (JP); Shinya Kikugawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/870,156

(22) Filed: Aug. 27, 2010

(65) Prior Publication Data

US 2010/0323873 A1 Dec. 23, 2010

Related U.S. Application Data

(63) Continuation of application No. PCT/JP2009/054223, filed on Feb. 27, 2009.

(30) Foreign Application Priority Data

Feb. 29, 2008 (JP) ................................. 2008-049352

(51) Int. Cl.
*C03C 3/06* (2006.01)
*C03C 3/11* (2006.01)
*C03C 3/112* (2006.01)

(52) U.S. Cl. ................................. 501/54; 501/56; 501/57

(58) Field of Classification Search .................... 501/53, 501/54, 56, 57; 65/17.4, 117
See application file for complete search history.

(56) References Cited

U.S. PATENT DOCUMENTS

| 7,053,017 B2 * | 5/2006 | Hrdina et al. ................... 501/54 |
| 7,294,595 B2 | 11/2007 | Iwahashi et al. |
| 7,410,922 B2 | 8/2008 | Iwahashi et al. |
| 7,419,924 B2 * | 9/2008 | Koike et al. ..................... 501/54 |
| 7,429,546 B2 | 9/2008 | Iwahashi et al. |

(Continued)

FOREIGN PATENT DOCUMENTS

JP 2005-104820 4/2005

(Continued)

OTHER PUBLICATIONS

Database WPI Week 198543, Thomas Scientific, London, GB; AN 1985-265754 XP002523296.

(Continued)

*Primary Examiner* — Jerry Lorengo
*Assistant Examiner* — Noah S Wiese
(74) *Attorney, Agent, or Firm* — Oblon, Spivak, McClelland, Maier & Neustadt, L.L.P.

(57) ABSTRACT

The present invention provides a $TiO_2$—$SiO_2$ glass whose coefficient of linear thermal expansion upon irradiation with high EUV energy light is substantially zero, which is suitable as an optical member of an exposure tool for EUVL. The present invention relates to a $TiO_2$-containing silica glass having a halogen content of 100 ppm or more; a fictive temperature of 1,100° C. or lower; an average coefficient of linear thermal expansion in the range of from 20 to 100° C. of 30 ppb/° C. or lower; a temperature width $\Delta T$, in which a coefficient of linear thermal expansion is 0±5 ppb/° C., of 5° C. or greater; and a temperature, at which a coefficient of linear thermal expansion is 0 ppb/° C., falling within the range of from 30 to 150° C.

19 Claims, 2 Drawing Sheets

U.S. PATENT DOCUMENTS

| | | |
|---|---|---|
| 7,462,574 B2 | 12/2008 | Iwahashi et al. |
| 7,485,593 B2 | 2/2009 | Ezaki et al. |
| 7,538,052 B2 | 5/2009 | Iwahashi et al. |
| 2002/0157421 A1 | 10/2002 | Ackerman et al. |
| 2005/0245382 A1* | 11/2005 | Iwahashi et al. ............... 501/54 |
| 2006/0179879 A1* | 8/2006 | Ellison et al. ............... 65/17.4 |
| 2006/0276323 A1* | 12/2006 | Iwahashi et al. ............... 501/54 |
| 2009/0122281 A1 | 5/2009 | Iwahashi et al. |
| 2010/0261597 A1 | 10/2010 | Koike et al. |

FOREIGN PATENT DOCUMENTS

| | | |
|---|---|---|
| WO | 2004/089836 | 10/2004 |
| WO | 2005/066090 | 7/2005 |

OTHER PUBLICATIONS

U.S. Appl. No. 12/862,174, filed Aug. 24, 2010, Koike, et al.
U.S. Appl. No. 12/869,035, filed Aug. 26, 2010, Koike, et al.
U.S. Appl. No. 12/868,900, filed Aug. 26, 2010, Koike, et al.

\* cited by examiner

TIO$_2$-CONTAINING SILICA GLASS AND OPTICAL MEMBER FOR LITHOGRAPHY USING THE SAME

TECHNICAL FIELD

The present invention relates a TiO$_2$-containing silica glass (hereinafter referred to as "TiO$_2$—SiO$_2$ glass" in this specification), and in particular, to a TiO$_2$—SiO$_2$ glass to be used as an optical member of an exposure tool for EUV lithography. The EUV (extreme ultraviolet) light as referred to in the invention means light having a wavelength in a soft X-ray region or a vacuum ultraviolet region, specifically light having a wavelength of from about 0.2 to 100 nm.

BACKGROUND ART

In the photolithography technology, an exposure tool for manufacturing an integrated circuit by transferring a fine circuit pattern onto a wafer has hitherto been widely utilized. With the trend toward a higher degree of integration and a higher function of an integrated circuit, the refinement of the integrated circuit is advancing. The exposure tool is hence required to form a circuit pattern image with high resolution on a wafer surface at a long focal depth, and shortening of the wavelength of an exposure light source is being advanced. The exposure light source is further advancing from conventional g-line (wavelength: 436 nm), i-line (wavelength: 365 nm) and a KrF excimer laser (wavelength: 248 nm), and an ArF excimer layer (wavelength: 193 nm) is coming to be employed. Also, in order to cope with a next-generation integrated circuit whose circuit line width will become 70 nm or less, an immersion lithography technique and a double exposure technique, each using an ArF excimer laser, are regarded as being leading. However, it is considered that even these techniques would be able to cover only the generation with a line width of up to 45 nm.

Under the foregoing technical trends, a lithography technique using, as an exposure light source, light having a wavelength of 13 nm to represent EUV light (extreme ultraviolet light) is considered to be applicable over generation of 32 nm and thereafter, and is attracting attention. The principle of image formation of the EUV lithography (hereinafter referred to as "EUVL") is identical with that of the conventional lithography from the viewpoint that a mask pattern is transferred using a projection optical system. However, since there is no material capable of transmitting light therethrough in the EUV light energy region, a refractive optical system cannot be used. Accordingly, the optical systems are all reflecting optical systems.

The optical member of an exposure tool for EUVL includes a photomask and a mirror and is basically configured with (1) a substrate, (2) a reflective multilayer formed on the substrate and (3) an absorber layer formed on the reflective multilayer. For the reflective multilayer, an Mo/Si reflective multilayer in which an Mo layer and an Si layer are alternately laminated is investigated; and for the absorber layer, Ta and Cr are investigated. For the substrate, a material having a low coefficient of thermal expansion is required so as not to generate a strain even under irradiation with EUV light, and a glass having a low coefficient of thermal expansion or the like is investigated.

The TiO$_2$—SiO$_2$ glass is known as an extremely low thermal expansion material having a coefficient of thermal expansion (CTE) lower than that of a silica glass. Also, since the coefficient of thermal expansion can be controlled by the TiO$_2$ content in glass, a zero-expansion glass whose coefficient of thermal expansion is close to 0 can be obtained. Accordingly, the TiO$_2$—SiO$_2$ glass involves a possibility as a material to be used in an optical member of an exposure tool for EUVL.

According to the conventional preparation method of a TiO$_2$—SiO$_2$ glass, first of all, a silica precursor and a titania precursor are each converted into a gas phase and then mixed with each other. The mixture in a gas phase is introduced into a burner and thermally decomposed, thereby forming TiO$_2$—SiO$_2$ glass particles. This TiO$_2$—SiO$_2$ glass particle is deposited in a refractory container and melted therein simultaneously with the deposition, thereby forming a TiO$_2$—SiO$_2$ glass.

Also, Patent Document 1 discloses a method in which a TiO$_2$—SiO$_2$ porous glass body is formed and converted it into a glass body, and a mask substrate is then obtained.

Since the optical member of an exposure tool for EUVL is irradiated with high-energy EUV light at the time of use in the exposure tool for EUVL, the temperature of the member locally rises. For that reason, it is preferable that the optical member of an exposure tool for EUVL has a wide temperature region where the coefficient of thermal expansion is substantially zero. The present inventors disclose, in Patent Document 2, a TiO$_2$—SiO$_2$ glass having a fictive temperature of 1,200° C. or lower, an F concentration of 100 ppm or more and a coefficient of thermal expansion in the range of from 0 to 100° C. of 0±200 ppb/° C. and a method for manufacturing this TiO$_2$—SiO$_2$ glass.

It had been thought that this TiO$_2$—SiO$_2$ glass is small in a change in the temperature dependence of a coefficient of thermal expansion, namely wide in the temperature range where the coefficient of thermal expansion is substantially zero, is excellent in homogeneity of the coefficient of thermal expansion and the mechanical properties in glass, and is extremely suitable as a raw material of the member which constitutes an optical system to be used for EUVL.

Patent Document 1: US-A-2002-157421
Patent Document 2: JP-A-2005-104820

DISCLOSURE OF THE INVENTION

In order to increase throughput of the exposure tool for EUVL, it is effective to increase the EUV light energy to be used for the exposure. In that case, there is a possibility that the temperature of the member rises exceeding an estimated temperature. Specifically, since there is a possibility that the temperature of the member rises to 40 to 110° C., it is preferred that the expansion of the member is substantially zero at such a temperature. This is to prevent a change in pitch of a pattern is prevented from occurring in the case of a photomask and the like, and to prevent a change in shape from occurring in the case of a stepper mirror and the like.

Also, when a dimensional change is large during a temperature rise of from room temperature to a temperature at the time of use in the exposure tool for EUVL, since the pitch or the shape of the above pattern changes from the state at the time of room temperature, there may be a possibility that an optical design of the optical member becomes complicated. Accordingly, it is preferred that an average coefficient of linear thermal expansion in the range of from room temperature to a temperature of 40 to 110° C. is small in an optical member for an exposure tool using high EUV energy light aiming at throughput rise.

However, in the foregoing conventional technologies, although the temperature range, in which the coefficient of linear thermal expansion is substantially zero, is wide, a temperature, at which the expansion is zero, is room temperature.

Thus, there is a possibility that the coefficient of linear thermal expansion is not zero at a temperature of 40 to 110° C., and the change in dimension and the change in shape cannot be neglected. Also, since the average coefficient of linear thermal expansion in the range of from room temperature to a temperature of 40 to 110° C. is large, there may be a problem that an optical design of the optical member becomes complicated.

In order to solve the above problems of the conventional technologies, an object of the invention is to provide a $TiO_2$—$SiO_2$ glass, which has suitable thermal expansion properties as an optical member for exposure tool using high EUV energy light aiming at an increase of throughput. More specifically, an object of the invention is to provide a $TiO_2$—$SiO_2$ glass whose coefficient of linear thermal expansion upon irradiation with high EUV energy light is substantially zero when used as an optical member of an exposure tool for EUVL.

The present invention provides a $TiO_2$-containing silica glass having a halogen content of 100 ppm or more; a fictive temperature of 1,100° C. or lower; an average coefficient of linear thermal expansion in the range of from 20 to 100° C. of 30 ppb/° C. or lower; a temperature width $\Delta T$, in which a coefficient of linear thermal expansion (CTE) is 0±5 ppb/° C., of 5° C. or greater; and a temperature (cross-over temperature; COT), at which a coefficient of linear thermal expansion (CTE) is 0 ppb/° C., falling within the range of from 30 to 150° C. (hereinafter referred to as "$TiO_2$—$SiO_2$ glass of the invention").

Also, it is preferred that the $TiO_2$—$SiO_2$ glass of the invention has a fluctuation width ($\Delta n$) of refractive index of $4 \times 10^{-4}$ or less within an area of 30 mm×30 mm in at least one plane.

Also, it is preferred that the $TiO_2$—$SiO_2$ glass of the invention is free from an inclusion.

Furthermore, it is preferred that the $TiO_2$—$SiO_2$ glass of the invention has a $TiO_2$ content of from 5 to 12% by mass.

The $TiO_2$—$SiO_2$ glass of the invention can be used as an optical member for EUV lithography.

Since in the $TiO_2$—$SiO_2$ glass of the invention, the temperature dependence of an average coefficient of linear thermal expansion from room temperature upon irradiation with high EUV energy light is very small, and a coefficient of linear thermal expansion upon irradiation with high EUV energy light is substantially zero, it is extremely suitable as an optical member of an exposure tool for EUVL.

BEST MODES FOR CARRYING OUT THE INVENTION

The $TiO_2$—$SiO_2$ glass of the invention is hereunder described with reference to the drawings.

In carrying out EUVL, for the purpose of preventing changes in dimension or shape of an optical member, such as a mirror, relative to the temperature, the COT of the $TiO_2$—$SiO_2$ glass of the invention which is placed within an exposure tool using high EUV energy light falls within the range of from 30 to 150° C. The COT is more preferably from 35 to 120° C., further preferably from 40 to 110° C., and especially preferably from 50 to 80° C.

In carrying out EUVL, for the purpose of preventing a change in dimension and shape of an optical member, such as a mirror, relative to the temperature, it is desirable that a coefficient of linear thermal expansion of an optical member which is placed within an exposure tool using high EUV energy light is 0±5 ppb/° C., namely the range where the coefficient of linear thermal expansion is substantially zero is wide. Specifically, the temperature $\Delta T$ at which the coefficient of linear thermal expansion is 0±5 ppb/° C. is preferably 5° C. or greater. It has been suggested that the temperature of an optical member, especially a member near a light source, locally rises because high-energy EUV light is irradiated. Though it depends on an irradiation condition of EUV light, it is estimated that the temperature of the optical member rises to the temperature range of from 40 to 110° C., and furthermore, there may be the case where a temperature difference of from about 4 to 6° C. is locally generated.

In the $TiO_2$—$SiO_2$ glass of the invention, the $\Delta T$ is 5° C. or greater. In the case where the $\Delta T$ is smaller than 5° C., when the $TiO_2$—$SiO_2$ glass is used as an optical member of an exposure tool for EUVL, there is a concern that the thermal expansion of the optical member is of a problem upon irradiation with EUV light. The $\Delta T$ is more preferably 6° C. or greater, further preferably 8° C. or greater, and especially preferably 10° C. or greater. What the $\Delta T$ is 15° C. or greater is more preferred because the CTE is able to attain 0±5 ppb/° C. within the temperature range of from 50 to 80° C.; and what the $\Delta T$ is 30° C. or greater is especially preferred because the CTE is able to attain 0±5 ppb/° C. within the temperature range of from 40 to 100° C.

Figure 1:
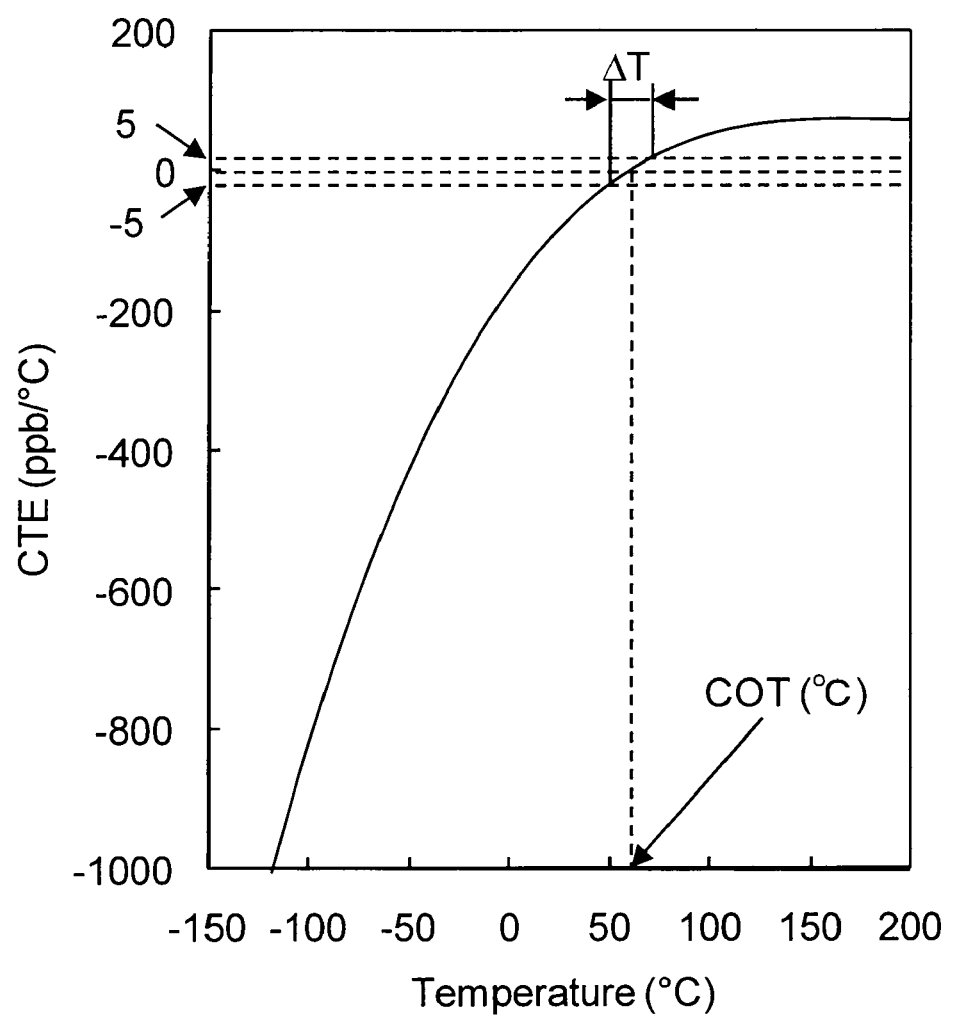
FIG. 1 is a graph plotting the relationship between the CTE and the temperature.

The average coefficient of linear thermal expansion in the range of from 20 to 100° C., the $\Delta T$ and the COT of the $TiO_2$—$SiO_2$ glass can be determined by measuring the coefficient of linear thermal expansion (CTE) of the $TiO_2$—$SiO_2$ glass by a known method, for example, by using a laser interferometric dilatometer within the temperature range of from −150 to +200° C. and plotting the relationship between the CTE and the temperature as shown in FIG. 1.

In the $TiO_2$—$SiO_2$ glass of the invention, the fictive temperature is 1,100° C. or lower. When the fictive temperature exceeds 1,100° C., the average coefficient of linear thermal expansion in the range of from 20 to 100° C. exceeds 30 ppb/° C.; and in the case where the $TiO_2$—$SiO_2$ glass is used as an optical member of an exposure tool for EUVL, there is a concern that the thermal expansion due to a change in temperature of the optical member is of a problem upon irradiation with EUV light. The fictive temperature is preferably 1,000° C. or lower, more preferably 950° C. or lower, further preferably 900° C. or lower, and especially preferably 850° C. or lower. In order to further reduce the average coefficient of linear thermal expansion in the range of from 20 to 100° C., the fictive temperature is preferably 800° C. or lower, and especially preferably 780° C. or lower.

With respect to a $TiO_2$-free $SiO_2$ glass, it has already been known that the halogen content affects the structural relaxation of the glass (for example, *Journal of Applied Physics*, 91(8), 4886 (2002)). According to this, the structural relaxation time is accelerated due to F so that it becomes easy to realize a glass structure having a low fictive temperature (first effect). The present inventors found that the incorporation of F into $TiO_2$-free $SiO_2$ glass also gives rise to an effect for lowering the fictive temperature and widening the temperature range of zero expansion (second effect) (see, for example, Patent Document 2).

Concerning the halogen, it has already been known that Cl also accelerates the structural relaxation time of a $TiO_2$-free $SiO_2$ glass as well as F so that it becomes easy to realize a glass structure having a low fictive temperature (first effect) (for example, *Applied Physics Letter*, 73(9), 1209 (1998)); and it can be expected that Cl also gives rises to the same effects as in F (first and second effects). The halogen is preferably F or Cl, and more preferably F.

Furthermore, the present inventors have now found that the incorporation of a halogen into the $TiO_2$—$SiO_2$ glass gives rise to an effect for increasing the temperature at which zero expansion is attained (third effect); and that the lower the fictive temperature of the glass, the larger the effect.

The $TiO_2$—$SiO_2$ glass of the invention has a halogen content of 100 ppm by mass or more. When the halogen content is less than 100 ppm by mass, the $\Delta T$ does not become 5° C. or greater. The halogen content is more preferably 500 ppm or more, further preferably 1,000 ppm or more, and especially preferably 7,000 ppm or more.

The halogen content can be measured by a known measurement method, for example, fluorescent X-ray analysis.

The F content can be measured by using a known method and, for example, can be measured according to the following procedures. That is, a $TiO_2$—$SiO_2$ glass is melted by heating with anhydrous sodium carbonate, and distilled water and hydrochloric acid are added to the obtained melt in a volume ratio to the melt of 1, respectively, thereby preparing a sample liquid.

An electromotive force of the sample liquid is measured by a radio meter using No. 945-220 and No. 945-468 (all of which are manufactured by Radio Meter Trading Co., Ltd.) as a fluorine ion selective electrode and a reference electrode, respectively; and the fluorine content is determined on the basis of a calibration curve which has been previously prepared using a fluorine ion standard solution (*Nippon Kagaku Kaishi*, 1972(2), 350). The detection limit of this method is 10 ppm.

In the $TiO_2$—$SiO_2$ glass of the invention, the average coefficient of linear thermal expansion in the range of from 20 to 100° C. is 30 ppb/° C. or lower. According to this, in carrying out irradiation with high-energy EUV light, even when the temperature of the optical member rises from room temperature to a high temperature, the changes in dimension and shape can be reduced. The average coefficient of linear thermal expansion in the range of from 20 to 100° C. is more preferably 20 ppb/° C. or lower, and especially preferably 10 ppb/° C. or lower. On the other hand, in the case where the COT is a high temperature, although the average coefficient of linear thermal expansion in the range of from 20 to 100° C. is liable to be a negative value, it is preferred for the same reasons that an absolute value of the average coefficient of linear thermal expansion in the range of from 20 to 100° C. is small. The average coefficient of linear thermal expansion in the range of from 20 to 100° C. is preferably −60 ppb/° C. or higher, more preferably −30 ppb/° C. or higher, and further preferably −20 ppb/° C. or higher. In the case where it is intended to make the change in dimension or shape smaller in carrying out irradiation with high-energy EUV light, the average coefficient of linear thermal expansion in the range of from 20 to 100° C. is preferably −10 ppb/° C. or higher.

In order to make the temperature width $\Delta T$, at which the coefficient of linear thermal expansion is 0±5 ppb/° C., great and to make the average coefficient of linear thermal expansion in the range of from 20 to 100° C. low, for example, to regulate the temperature width $\Delta T$, at which the coefficient of linear thermal expansion is 0±5 ppb/° C., to 8° C. or greater and to regulate the average coefficient of linear thermal expansion in the range of from 20 to 100° C. to 20 ppb/° C. or lower, it is necessary to regulate the halogen content, the $TiO_2$ content and the fictive temperature, respectively, thereby regulating the COT within the range of from 30 to 150° C. On that occasion, taking into account the foregoing third effect due to a halogen, in the case where it is intended to increase the halogen content, the $TiO_2$ content is regulated so as to be reduced. Also, even in the case where the halogen content is increased, when the fictive temperature of the glass is low, the $TiO_2$ content is regulated so as to be further reduced.

Specifically, in the case where the halogen content is from 100 to 1,000 ppm by mass, and the fictive temperature is from 850 to 1,100° C., the $TiO_2$ content is from 6 to 11% by mass; in the case where the halogen content is from 100 to 1,000 ppm by mass, and the fictive temperature is lower than 850° C., the $TiO_2$ content is from 5 to 10% by mass; in the case where the halogen content exceeds 1,000 ppm by mass, and the fictive temperature is from 850 to 1,100° C., the $TiO_2$ content is from 6 to 9% by mass; and in the case where the halogen content exceeds 1,000 ppm by mass, and the fictive temperature is lower than 850° C., the $TiO_2$ content is from 5 to 8% by mass.

In order to obtain the $TiO_2$—$SiO_2$ glass of the invention having a fictive temperature of 1,100° C. or lower, a method of keeping a $TiO_2$—$SiO_2$ glass molded article formed in a prescribed shape at a temperature of from 600 to 1,200° C. for 2 hours or more and then cooling to 500° C. or lower at an average cooling rate of 10° C./hr or lower is effective. In the Examples described below, it is shown that when the $TiO_2$—$SiO_2$ glass of the invention was kept at 1,000° C. for 10 hours and then subjected to temperature decrease to 300° C. at a rate of 5° C./hr, followed by allowing it to stand for natural cooling according to the foregoing method, the obtained $TiO_2$—$SiO_2$ glass had a fictive temperature of 750° C. When the glass is cooled at a slower average cooling rate, a lower fictive temperature is attained. For example, when the glass is cooled at a rate of 1° C./hr or lower, the fictive temperature can be 700° C. or lower.

Similarly, in order to make a variation of the fictive temperature fall within 50° C., a $TiO_2$—$SiO_2$ glass molded article may be kept at a temperature of from 600 to 1,200° C. for 2 hours or more and then subjected to temperature decrease to 500° C. or lower at an average cooling rate of 5° C./hr or lower.

The fictive temperature of the $TiO_2$—$SiO_2$ glass can be measured by known procedures. In the Examples as described below, the fictive temperature of the $TiO_2$—$SiO_2$ glass was measured by the following procedures.

With respect to a mirror-polished $TiO_2$—$SiO_2$ glass, an absorption spectrum is obtained by an infrared spectrometer (Magna 760, manufactured by Nikolet Company was used in the Examples as described below). In this measurement, a data-taking interval is set up at about $0.5\,\text{cm}^{-1}$, and an average value obtained by scanning 64 times is employed for the absorption spectrum. In the thus obtained infrared absorption spectrum, a peak observed in the vicinity of about $2,260\,\text{cm}^{-1}$ is attributed to an overtone of stretching vibration by an Si—O—Si bond of the $TiO_2$—$SiO_2$ glass. A calibration curve is prepared from a glass of the same composition having a known fictive temperature by using this peak position, thereby determining the fictive temperature. Alternatively, a reflection spectrum of the surface is measured in the same manner by using the same infrared spectrometer. In the thus obtained infrared reflection spectrum, a peak observed in the vicinity of about $1,120\,\text{cm}^{-1}$ is attributed to stretching vibration by an Si—O—Si bond of the $TiO_2$—$SiO_2$ glass. A calibration curve is prepared from a glass of the same composition having a known fictive temperature by using this peak position, thereby determining the fictive temperature. A shift of the peak position by a change in the glass composition can be extrapolated from the composition dependency of the calibration curve.

In the $TiO_2$—$SiO_2$ glass of the invention, a variation of the fictive temperature is preferably within 50° C., and more preferably within 30° C. When the variation of the fictive temperature exceeds the foregoing range, there is a concern that a difference in the coefficient of linear thermal expansion is generated depending upon the site.

In this specification, the "variation of the fictive temperature" is defined as a difference between the maximum value and the minimum value of the fictive temperature within an area of 30 mm×30 mm in at least one plane.

The variation of the fictive temperature can be measured as follows. A transparent $TiO_2$—$SiO_2$ glass body formed in a prescribed size is sliced to form a $TiO_2$—$SiO_2$ glass block of 50 mm×50 mm×6.35 mm. With respect to the 50 mm×50 mm plane of this $TiO_2$—$SiO_2$ glass block, by measuring a fictive temperature at intervals of a 10 mm pitch according to the foregoing method, the variation of the fictive temperature of the formed $TiO_2$—$SiO_2$ glass body is determined.

The $TiO_2$—$SiO_2$ glass of the invention preferably has a fluctuation width ($\Delta n$) of refractive index of $4\times10^{-4}$ or less within an area of 30 mm×30 mm in at least one plane. When the fluctuation width ($\Delta n$) of refractive index is $4\times10^{-4}$ or less, the surface roughness after polishing becomes small so that the extremely high surface smoothness tends to be obtained. The fluctuation width ($\Delta n$) of refractive index is more preferably $3.5\times10^{-4}$ or less, and further preferably $3\times10^{-4}$ or less.

In particular, in using the $TiO_2$-containing silica glass as an optical member for EUV lithography, in order to regulate the surface smoothness (rms) to 3 nm or less, the $\Delta n$ is preferably $4\times10^{-4}$ or less, more preferably $3\times10^{-4}$ or less, and further preferably $2\times10^{-4}$ or less. In order to make the surface smoothness (rms) smaller, for example, when it is to be regulated to 2 nm or less, the $\Delta n$ is preferably $1.5\times10^{-4}$ or less, more preferably $1\times10^{-4}$ or less, and especially preferably $0.5\times10^{-4}$ or less.

The surface smoothness (rms) is measured by the following method. With respect to a mirror-polished glass surface, the surface shape in a region to be used as an optical member is measured by a non-contact surface shape measuring system (NewView 5032, manufactured by Zygo Corporation). For the measurement, an objective lens with a magnification of 2.5 is used. The measured surface shape is divided in every square region of 2 mm×2 mm, from which are then calculated rms values, thereby defining the smoothness. Also, in calculating the rms value, data processing is carried out using a band-pass filter having a wavelength of from 10 μm to 1 mm, and waviness components having a wavelength other than the foregoing wavelength region are eliminated. The surface smoothness (rms) of the optical member for EUV lithography using the $TiO_2$-containing silica glass of the present invention is preferably 3 nm or less, more preferably 2 nm or less, furthermore preferably 1.5 nm or less and especially preferably 1 nm or less.

With respect to the measurement method of the fluctuation width $\Delta n$ of refractive index, it can be effected by a known method, for example, by using an optical interferometer. More specifically, for example, a cube of about 40 mm×40 mm×40 mm is cut out from a transparent $TiO_2$—$SiO_2$ glass body, sliced in a thickness of about 0.5 mm from each of the planes of the cube and then polished to obtain a plate-shaped $TiO_2$—$SiO_2$ glass block of 30 mm×30 mm×0.2 mm. Using a small-aperture Fizeau interferometer, only light having a specified wavelength is taken out from white light using a filter is vertically applied onto the plane of 30 mm×30 mm of this glass block, which is then enlarged with a magnification such that striae can be sufficiently observed; and the retardation distribution in the plane is examined, thereby measuring a fluctuation width $\Delta n$ of refractive index. In the case where the pitch of striae is fine, it is necessary to make the thickness of the plate-shaped $TiO_2$—$SiO_2$ glass block to be measured thin.

In the case of evaluating striae using the above optical interferometer, there is a possibility that the size of one pixel in CCD is not sufficiently small as compared with the width of striae, and there is a possibility that the striae cannot be sufficiently detected. In that case, it is preferred that the whole region in an area of 30 mm×30 mm is divided into plural small regions of, for example, about 1 mm×1 mm, and the measurement is carried out for each of the small regions.

In the $TiO_2$—$SiO_2$ glass of the invention, it is preferred that a difference between the maximum value and the minimum value of the $TiO_2$ concentration within an area of 30 mm×30 mm in one plane is 0.06% by mass or less. When the difference is 0.06% by mass or less, the surface smoothness after polishing becomes small so that the extremely high surface smoothness tends to be obtained. The difference between the maximum value and the minimum value of the $TiO_2$ concentration within an area of 30 mm×30 mm in one plane is more preferably 0.04% by mass or less.

In the $TiO_2$—$SiO_2$ glass, since sites different in a $TiO_2$/$SiO_2$ composition ratio are different in mechanical and chemical properties of the glass depending on the composition ratio, a polishing rate does not become constant, and it is hard to finish the glass surface after polishing so as to have the extremely high surface smoothness. When a $TiO_2$—$SiO_2$ glass having stripe-shaped striae at a pitch of from 10 to 200 μm is polished, "waviness" with pitches of the same degree as in the stria pitches is generated, and it is very hard to obtain the extremely high surface smoothness.

Also, irregularities of the polished surfaces by striae are caused by a stress to be generated by not only a difference in mechanical and chemical properties of the glass due to the fluctuation in the $TiO_2$/$SiO_2$ composition ratio but also a difference in the coefficient of linear thermal expansion caused due to the composition difference. Accordingly, for the purpose of reducing the stress between striae to suppress the formation of irregularities after polishing, it is effective to carry out cooling at a slower cooling rate in a temperature region in the vicinity of an annealing point or a strain point of the glass. In particular, in the halogen-containing glass, since the stress relaxation is accelerated, it is highly effective to carry out cooling at a slow cooling rate. Specifically, the slowest cooling rate in the cooling profile of the annealing step is preferably 10° C./hr or lower, and more preferably 5° C./hr or lower.

The $TiO_2$—$SiO_2$ glass of the invention preferably has a standard deviation ($\sigma$) of a stress level of striae of 0.04 MPa or lower within an area of 30 mm×30 mm in at least one plane. When the standard deviation ($\sigma$) is 0.04 MPa or lower, the surface roughness after polishing becomes small so that the extremely high surface smoothness tends to be obtained. The standard deviation ($\sigma$) of a stress level of striae is more preferably 0.03 MPa or lower, and especially preferably 0.02 MPa or lower.

The $TiO_2$—$SiO_2$ glass of the invention preferably has the maximum roughness (PV) of a stress level of striae of 0.20 MPa or lower within an area of 30 mm×30 mm in at least one plane. When the maximum roughness (PV) exceeds 0.20 MPa, since the sites different in a $TiO_2$/$SiO_2$ composition ratio are different in mechanical and chemical properties of the glass depending on the composition ratio, there is a possibility that the polishing rate does not become constant. The maximum roughness (PV) of a stress level of striae is more preferably 0.17 MPa or lower, further preferably 0.15 MPa or lower, and especially preferably 0.10 MPa or lower.

The $TiO_2$—$SiO_2$ glass of the invention preferably has a root mean square (RMS) of a stress level of striae of 0.20 MPa or lower within an area of 30 mm×30 mm in at least one plane. When the root mean square (RMS) is 0.20 MPa or lower, the surface roughness after polishing becomes small so that the extremely high surface smoothness tends to be obtained. The root mean square (RMS) is more preferably 0.17 MPa or lower, further preferably 0.15 MPa or lower, and especially preferably 0.10 MPa or lower.

The stress of striae of the $TiO_2$—$SiO_2$ glass can be determined according to the following formula by a known method, for example, by measuring a region of about 1 mm×1 mm using a birefringent microscope to determine its retardation.

$$\Delta = C \times F \times n \times d$$

Here, $\Delta$ represents a retardation; C represents a photoelastic constant; F represents a stress; n represents a refractive index; and d represents a sample thickness.

A profile of the stress is determined by the above method, from which the standard deviation ($\sigma$), the maximum roughness (PV) and the root mean square (RMS) can be determined. More specifically, for example, a cube of about 40 mm×40 mm×40 mm is cut out from a transparent $TiO_2$—$SiO_2$ glass body, sliced in a thickness of about 1 mm from each of the planes of the cube and then polished to obtain a plate-shaped $TiO_2$—$SiO_2$ glass block of 30 mm×30 mm×0.5 mm. Using a birefringent microscope, helium neon laser light is vertically applied onto the plane of 30 mm×30 mm of this glass block, which is then enlarged with a magnification such that striae can be sufficiently observed; and the in-plane retardation distribution is examined and converted into stress distribution. In the case where the pitch of striae is fine, it is necessary to make the thickness of the plate-shaped $TiO_2$—$SiO_2$ glass block to be measured thin.

As the method for manufacturing the halogen-containing $TiO_2$—$SiO_2$ glass of the invention, there are several processes as follows. As one example thereof, there is a manufacturing method in which a $TiO_2$—$SiO_2$ glass fine particle (soot) obtained by flame hydrolysis or thermal decomposition of a silica precursor and a titania precursor each serving as a glass-forming raw material is deposited and grown by a soot process, thereby obtaining a porous $TiO_2$—$SiO_2$ glass body; and the obtained porous $TiO_2$—$SiO_2$ glass body is treated in a halogen-containing atmosphere, then heated to a densification temperature or higher under a reduced pressure or in a helium atmosphere and further heated to a transparent vitrification temperature or higher, thereby obtaining a halogen-containing $TiO_2$—$SiO_2$ glass body. At that time, the variation of the halogen content can be improved by making the distribution of a bulk density of the porous $TiO_2$—$SiO_2$ glass body small and prolonging the treatment time in the halogen-containing gas atmosphere. In particular, in order to make the fluctuation width ($\Delta n$) of refractive index small, specifically when the fluctuation width ($\Delta n$) of refractive index is to be regulated to $4 \times 10^{-4}$ or less, it is preferred to regulate the bulk density of the porous $TiO_2$—$SiO_2$ glass body and the foregoing treatment time to 0.7 g/cm$^3$ or less and 4 hours or more, respectively.

Examples of the soot process include an MCVD process, an OVD process and a VAD process depending upon the preparation manner.

The densification temperature as referred to in this specification means a temperature at which the porous glass body can be densified to such an extent that a void cannot be confirmed by an optical microscope. Also, the transparent vitrification temperature as referred to in this specification means a temperature at which a crystal cannot be confirmed by an optical microscope, and a transparent glass is obtained.

In the soot process, in carrying out flame hydrolysis or thermal decomposition of a silica precursor and a titania precursor each serving as a glass-forming raw material, a halogen-containing porous $TiO_2$—$SiO_2$ glass body can be obtained by simultaneously supplying a halogen-containing gas, thereby depositing and growing a halogen-containing $TiO_2$—$SiO_2$ glass fine particle (soot). In that case, a heat source is preferably plasma. Different from the oxyhydrogen flame, the use of plasma as the heat source enables to decrease the water content in the synthesis atmosphere, and the halogen content can be increased. Also, the fluctuation width ($\Delta n$) of refractive index can be made small. In particular, in order to obtain a $TiO_2$—$SiO_2$ glass body having a fluctuation width ($\Delta n$) of refractive index of $4 \times 10^{-4}$ or less and a halogen content of 5,000 ppm by mass or more, it is preferred to use plasma as the heat source.

Also, there is a manufacturing method as a direct method in which a silica precursor and a titania precursor each serving as a halogen-containing glass-forming raw material are hydrolyzed and oxidized in an oxyhydrogen flame at from 1,800 to 2,000° C., thereby obtaining a halogen-containing $TiO_2$—$SiO_2$ glass body. At that time, the halogen content is controlled by controlling the flame temperature or gas concentration.

In the $TiO_2$—$SiO_2$ glass of the invention, so far as the variation of the halogen content falls within 20% of the average content, and the variation of the fictive temperature falls within 50° C., it enables the distribution of coefficient of linear thermal expansion to fall within 30 ppb/° C. within an area of 30 mm×30 mm in at least one plane, and hence is suitable as an optical member of an exposure tool for EUVL.

The distribution of coefficient of linear thermal expansion of the $TiO_2$—$SiO_2$ glass can be measured by using a known method. For example, a transparent $TiO_2$—$SiO_2$ glass body formed in a prescribed size is cut and divided into $TiO_2$—$SiO_2$ glass small pieces of 15 mm×15 mm×1 mm, and the respective small pieces are measured for a coefficient of linear thermal expansion by using the foregoing method (for example, a laser interferometric dilatometer), thereby determining the variation of the coefficient of linear thermal expansion of a formed $TiO_2$—$SiO_2$ glass block.

For the purpose of manufacturing the $TiO_2$—$SiO_2$ glass of the invention, a manufacturing method including the following steps (a) to (e) can be adopted.

Step (a):

$TiO_2$—$SiO_2$ glass fine particles obtained through flame hydrolysis of a silica precursor and a titania precursor each serving as a glass-forming raw material are deposited and grown on a substrate, thereby forming a porous $TiO_2$—$SiO_2$ glass body. The glass-forming raw material is not particularly limited so far as it is a raw material capable of being gasified. Examples of the silica precursor include silicon halides such as chlorides, for example, $SiCl_4$, $SiHCl_3$, $SiH_2Cl_2$, $SiH_3Cl$, fluorides, for example, $SiF_4$, $SiHF_3$, $SiH_2F_2$, bromides, for example, $SiBr_4$, $SiHBr_3$, and iodides, for example, $SiI_4$; and alkoxysilanes represented by $R_nSi(OR)_{4-n}$ (wherein R represents an alkyl group having from 1 to 4 carbon atoms; n represents an integer of from 0 to 3; and the plural R may be the same or different). Also, examples of the titania precursor include titanium halides, for example, $TiCl_4$, $TiBr_4$; and alkoxy titaniums represented by $R_nTi(OR)_{4-n}$ (wherein R represents an alkyl group having from 1 to 4 carbon atoms; n represents an integer of from 0 to 3; and the plural R may be the same or different). Also, as the silica precursor and the titania precursor, a compound of Si and Ti such as a silicon titanium double alkoxide can be used.

A seed rod made by silica glass (for example, the seed rod described in JP-B-63-24973) can be used as the substrate. Also, the shape of the substrate to be used is not limited to a rod form but may be in a plate form.

Step (b):

The porous $TiO_2$—$SiO_2$ glass body obtained in the step (a) is kept in a halogen-containing atmosphere at a temperature of the densification temperature or lower, thereby obtaining a halogen-containing porous $TiO_2$—$SiO_2$ glass body. This halogen-containing atmosphere is preferably an inert gas atmosphere containing from 0.1 to 100% by volume of a fluorine-containing gas (for example, $SiF_4$, $SF_6$, $CHF_3$, $CF_4$, $C_2F_6$, $C_3F_8$, $F_2$). It is preferred that the treatment in such an atmosphere at a pressure of from 10,000 to 200,000 Pa for from several ten minutes to several hours is carried out at a high temperature of the densification temperature or lower as described below. Also, when it is intended to lower the treatment temperature for obtaining the same doping amount of fluorine, this can be obtained by prolonging the treatment time and keeping the porous $TiO_2$—$SiO_2$ glass body for from 5 to several ten hours. In order to increase the transmittance of the obtained glass, it is preferred to mix an oxygen gas in the heat treatment atmosphere.

Also, in the step (b), for the reason that the homogeneity of the $TiO_2$—$SiO_2$ dense body increase, it is preferred that after placing the porous $TiO_2$—$SiO_2$ glass body under a reduced pressure (preferably 13,000 Pa or lower, and especially preferably 1,300 Pa or lower), an inert gas and a halogen gas are introduced until a prescribed partial pressure is attained, thereby forming a halogen-containing atmosphere. In order to further enhance the homogeneity, it is preferred to repeat the works for forming a halogen-containing atmosphere under a reduce pressure plural times.

The use of a temperature which is higher than the densification temperature is not preferred because the densification of the porous $TiO_2$—$SiO_2$ glass body proceeds so that it becomes hard to incorporate fluorine into the interior of the porous $TiO_2$—$SiO_2$ glass body.

For example, when $SiF_4$ is used as the halogen-containing atmosphere, the treatment temperature and treatment time as follows can be set in accordance with the amount of fluorine to be incorporated through doping into the porous $TiO_2$—$SiO_2$ glass body.

When it is intended to regulate the doping amount of fluorine to 100 ppm or more and less than 1,000 ppm, this may be achieved by keeping the porous $TiO_2$—$SiO_2$ glass body in a gas atmosphere containing from 5 to 20% by volume of a fluorine-containing gas at room temperature for from 1 to several ten hours. When it is intended to regulate the doping amount of fluorine to from 1,000 ppm or more and less than 3,000 ppm, this may be achieved by keeping the porous $TiO_2$—$SiO_2$ glass body in a gas atmosphere containing from 2 to 10% by volume of a fluorine-containing gas at from 500 to 1,000° C. for from 2 to several ten hours. When it is intended to regulate the doping amount of fluorine to from 3,000 to 7,000 ppm, this may be achieved by keeping the porous $TiO_2$—$SiO_2$ glass body in an inert gas atmosphere containing from 5 to several tens % by volume of a fluorine-containing gas at from 800° C. to 1,100° C. for from 2 to several ten hours. When it is intended to regulate the doping amount of fluorine to 7,000 ppm or more, this may be achieved by keeping the porous $TiO_2$—$SiO_2$ glass body in an inert gas atmosphere containing from 5 to several tens % by volume of a fluorine-containing gas at 1,000° C. or higher for from 2 to several ten hours.

In order to increase the transmittance of the obtained glass, it is preferred to mix an oxygen gas in the heat treatment atmosphere. Alternatively, the glass body is kept in an oxygen-containing atmosphere at from 300 to 1,300° C. for from 5 to several ten hours to such an extent that it is not densified. This is made for the purpose of preventing coloration of the glass in the sequent heat treatment. The concentration of oxygen in the atmosphere is preferably from 1 to 100%, and for the purpose of preventing coloration of the glass more surely, it is more preferably from 20 to 100%.

In the case where fluorine is doped on a synthetic silica glass to be synthesized by a soot process as in the a traditional way, it has been pointed out that doping with fluorine at a high temperature generates an oxygen deficient defect, which causes a reduction of the light transmittance. However, when used for an optical member to be used in a reflecting optical system, the reduction of the light transmittance does not matter. Accordingly, by treating at a temperature of the transparent vitrification temperature or lower, it is possible to incorporate an extremely large amount of fluorine, and the doping amount of fluorine can be several thousand ppm or more at maximum.

Step (c):

The halogen-containing $TiO_2$—$SiO_2$ dense body obtained in the step (b) is subjected to temperature rise to the transparent vitrification temperature, thereby obtaining a halogen-containing transparent $TiO_2$—$SiO_2$ glass body. In the invention, the transparent vitrification temperature is usually from 1,300 to 1,750° C., and especially preferably from 1,350 to 1,700° C.

As the atmosphere, an atmosphere of 100% of an inert gas such as helium or argon, or an atmosphere containing, as a major component, an inert gas such as helium and/or argon, is preferred. With respect to the pressure, a reduced pressure or normal pressure can be applicable. In the case of a reduced pressure, the pressure is preferably 13,000 Pa or lower.

Step (d):

The halogen-containing transparent $TiO_2$—$SiO_2$ glass body obtained in the step (c) is heated at a temperature of the softening point or higher and formed in a desired shape, thereby obtaining a halogen-containing formed $TiO_2$—$SiO_2$ glass body. The forming temperature is preferably from 1,500 to 1,800° C. When the forming temperature is lower than 1,500° C., since the viscosity of the halogen-containing transparent $TiO_2$—$SiO_2$ glass body is high, deformation due to own weight does not substantially proceed. Also, the growth of cristobalite which is a crystal phase of $SiO_2$ or the growth of rutile or anatase which is a crystal phase of $TiO_2$ occurs, thereby possibly causing so-called devitrification. When the forming temperature exceeds 1,800° C., there is a concern that sublimation of $SiO_2$ cannot be neglected.

The step (c) and the step (d) can be carried out continuously or simultaneously.

Step (e):

The formed $TiO_2$—$SiO_2$ glass body obtained in the step (d) is kept at a temperature of from 600 to 1,200° C. for one hour or more and then subjected to an annealing treatment for decreasing the temperature to 500° C. or lower at an average temperature-decreasing rate of 10° C./hr or lower, thereby controlling the fictive temperature of the $TiO_2$—$SiO_2$ glass. Alternatively, the formed $TiO_2$—$SiO_2$ glass body obtained in the step (d) at 1,200° C. or higher is subjected to an annealing treatment for decreasing the temperature to 500° C. or lower at an average temperature-decreasing rate of 60° C./hr or lower, thereby controlling the fictive temperature of the $TiO_2$—$SiO_2$ glass. After decreasing the temperature to 500° C. or lower, natural cooling can be adaptable. In that case, the atmosphere is preferably an atmosphere of 100% of an inert gas, such as helium, argon, or nitrogen, an atmosphere containing, as a major component, such an inert gas, or an air atmosphere; and the pressure is preferably a reduced pressure or normal pressure.

For the purpose of attaining a lower fictive temperature, it is effective to carry out cooling at a slower cooling rate in a temperature region in the vicinity of an annealing point or a strain point of the glass. Also, in particular, in the halogen-containing glass of the invention, for the purpose of reducing the stress between striae to suppress the formation of irregularities after polishing, it is effective to carry out cooling at a slower cooling rate in a temperature region in the vicinity of an annealing point or a strain point of the glass. Specifically, the slowest cooling rate in the cooling profile of the step (e) is preferably 10° C./hr or lower, more preferably 5° C./hr or lower, further preferably 2° C./hr or lower, and especially preferably 1° C./hr or lower.

In particular, in order to attain a lower fictive temperature, it is effective to carry out cooling at a slower cooling rate in a temperature region (for example, an annealing point ±25° C.) in the vicinity of an annealing point of the glass. Also, for the purpose of reducing the stress between striae to suppress the formation of irregularities after polishing, it is effective to carry out cooling at a slower cooling rate in a temperature region (for example, a strain point ±25° C.) in the vicinity of a strain point of the glass.

It is preferred that the $TiO_2$—$SiO_2$ glass of the invention is free from an inclusion. The inclusion as referred to herein means a foreign matter, a bubble or the like existing in the glass. There is a concern that the foreign matter is generated by contamination or crystal precipitation in a glass manufacturing process. In order to eliminate the inclusion, such as a foreign matter and a bubble, it is necessary to control the contamination especially in the step (a), and further to precisely control the temperature conditions of the steps (b) to (d).

An optical member of an exposure tool for EUVL using the $TiO_2$—$SiO_2$ glass of the invention facilitates attainment of a surface with extremely high surface smoothness.

EXAMPLES

The invention will be illustrated in greater detail with reference to the following Examples, but the invention should not be construed as being limited thereto. Examples 1 to 5 are invention examples, and the remainder is comparative examples.

Example 1

$TiO_2$—$SiO_2$ glass fine particles obtainable by gasifying $TiCl_4$ and $SiCl_4$ each serving as a glass-forming raw material of a $TiO_2$—$SiO_2$ glass, respectively and then mixing them and subjecting the mixture to heat hydrolysis (flame hydrolysis) in an oxyhydrogen flame is deposited and grown on a substrate, thereby forming a porous $TiO_2$—$SiO_2$ glass body (step (a)).

Since it is hard to handle the obtained porous $TiO_2$—$SiO_2$ glass body without any treatment, the obtained porous $TiO_2$—$SiO_2$ glass body is kept in air at 1,200° C. for 4 hours together with substrate and then separated from the substrate.

Thereafter, the porous $TiO_2$—$SiO_2$ glass body is placed in an atmosphere-controllable electric furnace, and the pressure is reduced to 1,333 Pa at room temperature. Thereafter, the resulting porous $TiO_2$—$SiO_2$ glass body is kept in this atmosphere at 1,100° C. under normal pressure for 4 hours while introducing a mixed gas of He and $SiF_4$ in a ratio 90/10 (by volume), thereby effecting doping with fluorine.

Thereafter, the system is kept in an atmosphere of 100% $O_2$ at 1,050° C. under normal pressure for 4 hours; and thereafter, the temperature is raised to 1,450° C. in an atmosphere of 100% He, and the system is then kept at this temperature for 4 hours, thereby obtaining a fluorine-containing $TiO_2$—$SiO_2$ dense body (step (b)).

The obtained fluorine-containing $TiO_2$—$SiO_2$ dense body is heated to 1,650° C. in an argon atmosphere using a carbon furnace, thereby obtaining a fluorine-containing transparent $TiO_2$—$SiO_2$ glass body (step (c)).

The obtained fluorine-containing transparent $TiO_2$—$SiO_2$ glass body is heated to a temperature of the softening point or higher (1,750° C.) and formed in a desired shape, thereby obtaining a fluorine-containing formed $TiO_2$—$SiO_2$ glass body (step (d)).

The obtained glass is kept at 1,000° C. for 10 hours and then subjected to temperature decrease to 300° C. at a rate of 5° C./hr, followed by allowing it to stand for natural cooling (step (e)).

Example 2

$TiO_2$—$SiO_2$ glass fine particles obtainable by gasifying $TiCl_4$ and $SiCl_4$ each serving as a glass-forming raw material of a $TiO_2$—$SiO_2$ glass, respectively and then mixing them and subjecting the mixture to heat hydrolysis (flame hydrolysis) in an oxyhydrogen flame is deposited and grown on a substrate, thereby forming a porous $TiO_2$—$SiO_2$ glass body (step (a)).

Since it is hard to handle the obtained porous $TiO_2$—$SiO_2$ glass body without any treatment, the obtained porous $TiO_2$—$SiO_2$ glass body is kept in air at 1,200° C. for 4 hours together with the substrate and then separated from the substrate.

Thereafter, the porous $TiO_2$—$SiO_2$ glass body is placed in an atmosphere-controllable electric furnace, and the pressure is reduced to 1,333 Pa at room temperature. Thereafter, a mixed gas of He and $SiF_4$ in a ratio 90/10 (by volume) is introduced; the pressure is again reduced to 1,333 Pa; and thereafter, a mixed gas of He and $SiF_4$ in a ratio 90/10 (by volume) is introduced. After repeating this operation ten times, the resulting porous $TiO_2$—$SiO_2$ glass body is doped with fluorine in an atmosphere of a mixed gas of He and $SiF_4$ in a ratio 90/10 (by volume) at room temperature under normal pressure for 24 hours.

Thereafter, the system is kept in an atmosphere of 100% $O_2$ at 1,050° C. under normal pressure for 4 hours; and thereafter, the temperature is raised to 1,450° C. in an atmosphere of 100% He, and the system is then kept at this temperature for 4 hours, thereby obtaining a fluorine-containing $TiO_2$—$SiO_2$ dense body (step (b)).

The obtained fluorine-containing $TiO_2$—$SiO_2$ dense body is heated to 1,650° C. in an argon atmosphere using a carbon furnace, thereby obtaining a fluorine-containing transparent $TiO_2$—$SiO_2$ glass body (step (c)).

The obtained fluorine-containing transparent $TiO_2$—$SiO_2$ glass body is heated to 1,750° C. and formed in a desired shape, thereby obtaining a fluorine-containing formed $TiO_2$—$SiO_2$ glass body (step (d)).

The obtained glass is kept at 1,000° C. for 10 hours and then subjected to temperature decrease to 300° C. at a rate of 5° C./hr, followed by allowing it to stand for natural cooling (step (e)).

Example 3

$TiO_2$—$SiO_2$ glass fine particles obtainable by gasifying $TiCl_4$ and $SiCl_4$ each serving as a glass-forming raw material of a $TiO_2$—$SiO_2$ glass, respectively and then mixing them and subjecting the mixture to heat hydrolysis (flame hydrolysis) in an oxyhydrogen flame is deposited and grown on a substrate, thereby forming a porous $TiO_2$—$SiO_2$ glass body (step (a)).

Since it is hard to handle the obtained porous $TiO_2$—$SiO_2$ glass body without any treatment, the obtained porous $TiO_2$—$SiO_2$ glass body is kept in air at 1,200° C. for 4 hours together with the substrate and then separated from the substrate.

Thereafter, the porous $TiO_2$—$SiO_2$ glass body is placed in an atmosphere-controllable electric furnace, and the pressure is reduced to 1,333 Pa at room temperature. Thereafter, the resulting porous $TiO_2$—$SiO_2$ glass body is kept in this atmosphere at 1,100° C. under normal pressure for 4 hours while introducing a mixed gas of He and $SiF_4$ in a ratio 90/10 (by volume), thereby effecting doping with fluorine.

Thereafter, the system is kept in an atmosphere of 100% $O_2$ at 1,050° C. under normal pressure for 4 hours; and thereafter, the temperature is raised to 1,450° C. in an atmosphere of 100% He, and the system is then kept at this temperature for 4 hours, thereby obtaining a fluorine-containing $TiO_2$—$SiO_2$ dense body (step (b)).

The obtained fluorine-containing $TiO_2$—$SiO_2$ dense body is heated to 1,700° C. in an argon atmosphere using a carbon furnace, thereby obtaining a fluorine-containing transparent $TiO_2$—$SiO_2$ glass body (step (c)).

The obtained fluorine-containing transparent $TiO_2$—$SiO_2$ glass body is heated to 1,700° C. and formed in a desired shape, thereby obtaining a fluorine-containing formed $TiO_2$—$SiO_2$ glass body (step (d)).

The obtained glass is kept at 1,100° C. for 10 hours and then subjected to temperature decrease to 300° C. at an average temperature-decreasing rate of 150° C./hr, followed by allowing it to stand for natural cooling (step (e)).

Example 4

$TiO_2$—$SiO_2$ glass fine particles obtainable by gasifying $TiCl_4$ and $SiCl_4$ each serving as a glass-forming raw material of a $TiO_2$—$SiO_2$ glass, respectively and then mixing them and subjecting the mixture to heat hydrolysis (flame hydrolysis) in an oxyhydrogen flame is deposited and grown on a substrate, thereby forming a porous $TiO_2$—$SiO_2$ glass body (step (a)).

Since it is hard to handle the obtained porous $TiO_2$—$SiO_2$ glass body without any treatment, the obtained porous $TiO_2$—$SiO_2$ glass body is kept in air at 1,200° C. for 4 hours together with the substrate and then separated from the substrate.

Thereafter, the porous $TiO_2$—$SiO_2$ glass body is placed in an atmosphere-controllable electric furnace, and the pressure is reduced to 1,333 Pa at room temperature. Thereafter, the temperature is raised to 1,450° C. in an atmosphere of 100% He, and the system is then kept at this temperature for 4 hours, thereby obtaining a fluorine-containing $TiO_2$—$SiO_2$ dense body (step (b)).

The obtained $TiO_2$—$SiO_2$ dense body is heated to 1,700° C. in an argon atmosphere using a carbon furnace, thereby obtaining a transparent $TiO_2$—$SiO_2$ glass body (step (c)).

The obtained transparent $TiO_2$—$SiO_2$ glass body is heated to 1,750° C. and formed in a desired shape, thereby obtaining a formed $TiO_2$—$SiO_2$ glass body (step (d)).

The obtained glass is kept at 1,100° C. for 10 hours and then subjected to temperature decrease to 500° C. at an average temperature-decreasing rate of 150° C./hr, followed by allowing it to stand for natural cooling (step (e)).

Example 5

The $TiO_2$—$SiO_2$ glass of Example 1 disclosed in Patent Document 2 is prepared.

Example 6

ULE#7972, manufactured by Corning Incorporated, which is known as a zero-expansion $TiO_2$—$SiO_2$ glass is prepared.

Figure 2:
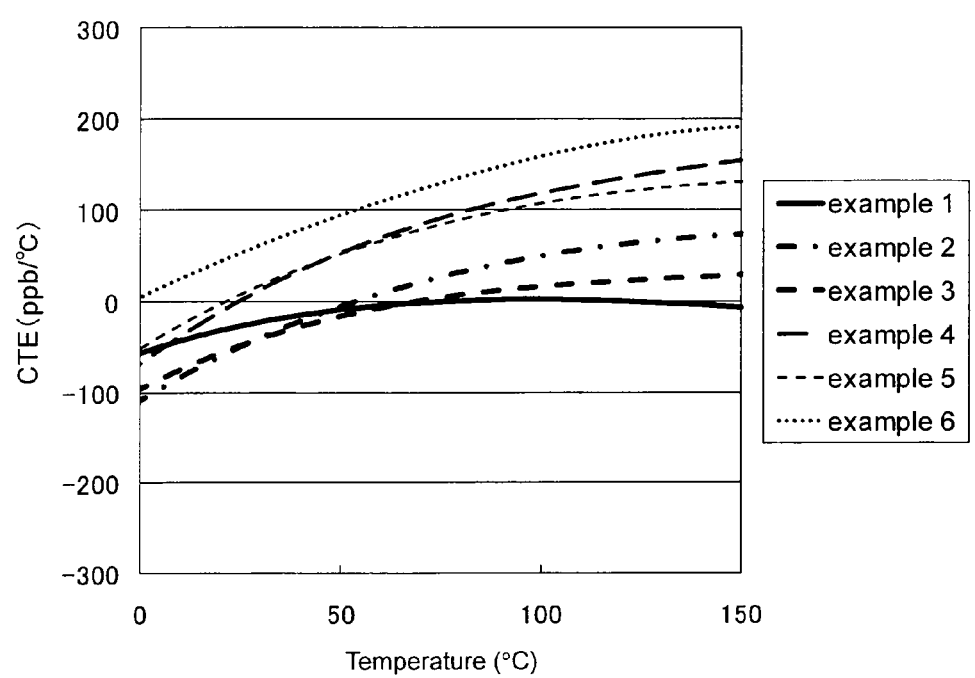
FIG. 2 is a graph plotting the relationship between the CTE and the temperature with respect to Examples 1 to 5.

Results of the measurement of respective physical properties of the glasses prepared in the foregoing Examples 1 to 6 are summarized and shown in Table 1. With respect to the evaluation methods, the measurements are made in accordance with the above-described measurement methods, respectively. Also, the COT shown in Table 1 is derived by determining the temperature at which the coefficient of linear thermal expansion is 0 ppb/° C. from the curve shown in FIG. 2. The ΔT shown in Table 1 is derived by determining the temperature range where the coefficient of linear thermal expansion is from −5 to 5 ppb/° C. from the curve shown in FIG. 2.

TABLE 1

|  | Fictive temperature [° C.] | F content [ppm] | COT [° C.] | ΔT [° C.] | Average coefficient of linear thermal expansion in the range of from 20 to 100° C. [ppm/° C.] |
|---|---|---|---|---|---|
| Example 1 | 750 | 9000 | 76 | 85 | −9.0 |
| Example 2 | 1020 | 890 | 53 | 6.9 | 2.0 |
| Example 3 | 950 | 8000 | 68 | 14 | −13 |
| Example 4 | 1070 | — | 24 | 4.1 | 61 |
| Example 5 | 890 | 6300 | 24 | 7.6 | 31 |
| Example 6 | 900 | — | −2.4 | 4.7 | 103 |

The glasses of Examples 1 to 3 have a variation of the fictive temperature falling within 50° C. and a variation of the fluorine content falling within 50 ppm. Also, the glasses of Examples 1 to 3 have a fluctuation width (Δn) of refractive index of $4 \times 10^{-4}$ or less within an area of 30 mm×30 mm in at least one plane; a standard deviation (σ) of a stress level of 0.04 MPa or lower within an area of 30 mm×30 mm in at least one plane; and the maximum roughness (PV) of a stress level of striae of 0.20 MPa or lower within an area of 30 mm×30 mm in at least one plane.

As is clear from Table 1, in Examples 1 to 3 having a ΔT of 5° C. or greater and an average coefficient of linear thermal expansion in the range of from 20 to 100° C. of 30 ppb/° C. or lower, the coefficient of linear thermal expansion is substantially zero upon irradiation with high EUV energy light, and the CTE is stably substantially zero over a wide temperature range, and therefore, the glasses of these Examples 1 to 3 are suitable as an optical member of an exposure tool for EUVL.

While the invention has been described in detail and with reference to specific embodiments thereof, it will be apparent to one skill in the art that various changes and modifications can be made therein without departing from the sprit and scope thereof.

This application is based on Japanese patent application No. 2008-049352 filed on Feb. 29, 2008, the entire contents of which are incorporated hereinto by reference. All references cited herein are incorporated in their entirety.

INDUSTRIAL APPLICABILITY

The silica glass and the optical member of the invention are suitable as an exposure tool for EUV lithography.

The invention claimed is:

1. A $TiO_2$-containing silica glass having a halogen content of 100 ppm or more; a fictive temperature of 1,100° C. or lower; an average coefficient of linear thermal expansion in a range of from 20 to 100° C. of 30 ppb/° C. or lower; a temperature width $\Delta T$, in which a coefficient of linear thermal expansion is 0±5 ppb/° C., of 8° C. or greater; and a temperature, at which a coefficient of linear thermal expansion is 0 ppb/° C., falling within a range of from 40 to 110° C.

2. The $TiO_2$-containing silica glass according to claim 1, having a fluctuation width ($\Delta n$) of refractive index of $4\times10^{-4}$ or less within an area of 30 mm×30 mm in at least one plane.

3. The $TiO_2$-containing silica glass according to claim 1, which is free from an inclusion.

4. The $TiO_2$-containing silica glass according to claim 1, having a $TiO_2$ content of from 5 to 12% by mass.

5. An optical member for EUV lithography using the $TiO_2$-containing silica glass according to claim 1.

6. The $TiO_2$-containing silica glass according to claim 1, wherein a coefficient of linear thermal expansion is 0 ppb/° C., falling within a range of from 50 to 80° C.

7. The $TiO_2$-containing silica glass according to claim 1, wherein said $\Delta T$ is 10° C. or greater.

8. The $TiO_2$-containing silica glass according to claim 1, wherein said $\Delta T$ is 15° C. or greater.

9. The $TiO_2$-containing silica glass according to claim 1, wherein said $\Delta T$ is 30° C. or greater.

10. The $TiO_2$-containing silica glass according to claim 1, wherein said halogen is F.

11. The $TiO_2$-containing silica glass according to claim 1, wherein said halogen is Cl.

12. The $TiO_2$-containing silica glass according to claim 1, wherein said halogen content is 500 ppm or more.

13. The $TiO_2$-containing silica glass according to claim 1, wherein said halogen content is 1,000 ppm or more.

14. The $TiO_2$-containing silica glass according to claim 1, wherein said halogen content is 7,000 ppm or more.

15. The $TiO_2$-containing silica glass according to claim 1, wherein said halogen content is from 100 to 1,000 ppm, a fictive temperature is from 850 to 1,100° C. and a $TiO_2$ content is from 6 to 11% by mass.

16. The $TiO_2$-containing silica glass according to claim 1, wherein said halogen content is from 100 to 1,000 ppm, a fictive temperature is lower than 850° C. and a $TiO_2$ content is from 5 to 10% by mass.

17. The $TiO_2$-containing silica glass according to claim 1, wherein said halogen content exceeds 1,000 ppm, a fictive temperature is from 850 to 1,100° C. and a $TiO_2$ content is from 6 to 9% by mass.

18. The $TiO_2$-containing silica glass according to claim 1, wherein said halogen content exceeds 1,000 ppm, a fictive temperature is lower than 850° C. and a $TiO_2$ content is from 5 to 8% by mass.

19. A method for conducting EUVL with an optical member for an exposure tool for EUVL in which a temperature of the optical member rises to a temperature range of from 40 to 110° C., wherein said optical member comprises the $TiO_2$-containing silica glass according to claim 1.

* * * * *